Aug. 8, 1944.   S. BLOOMFIELD   2,355,264
WINDSHIELD FOR MOTOR VEHICLES
Filed May 24, 1943   2 Sheets-Sheet 1
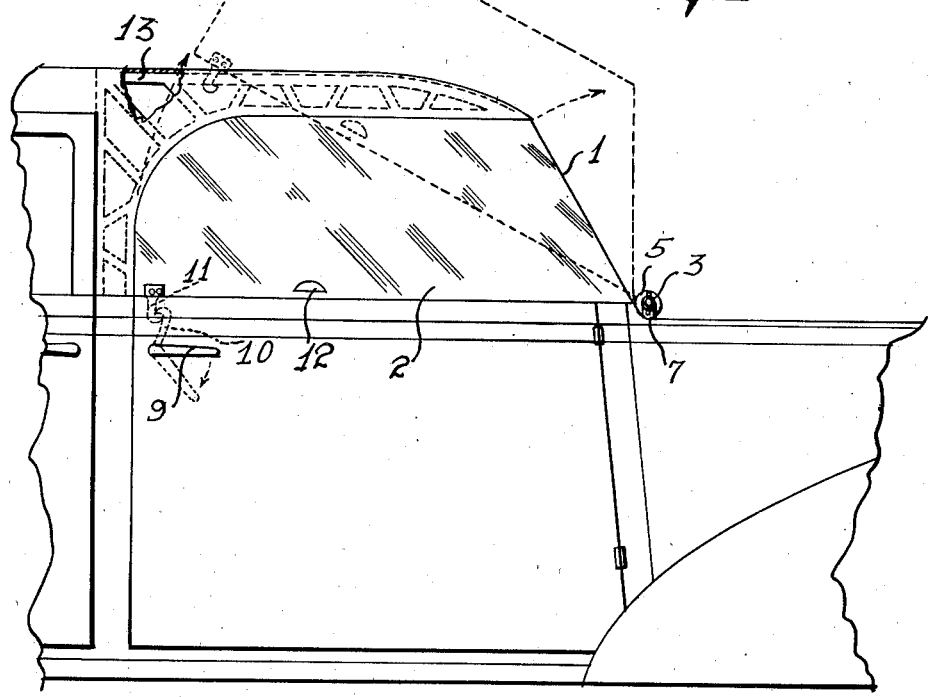
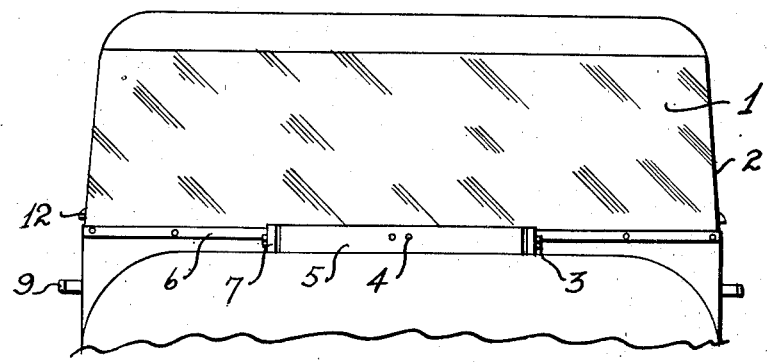
INVENTOR.
SAM BLOOMFIELD Aug. 8, 1944.  S. BLOOMFIELD  2,355,264
WINDSHIELD FOR MOTOR VEHICLES
Filed May 24, 1943  2 Sheets-Sheet 2
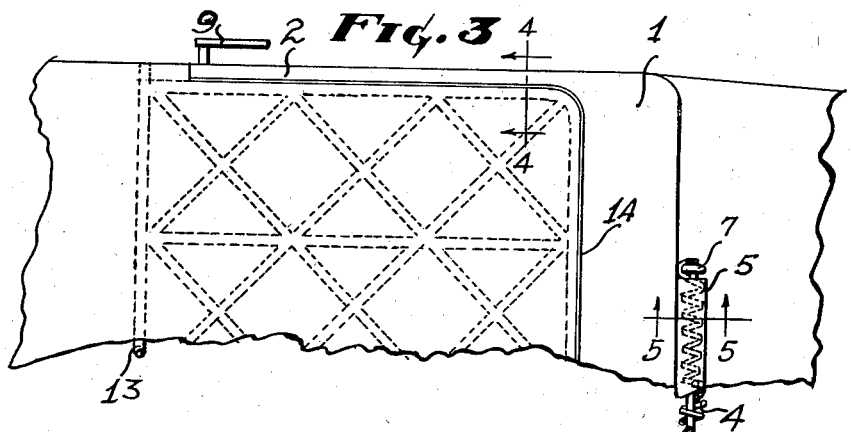
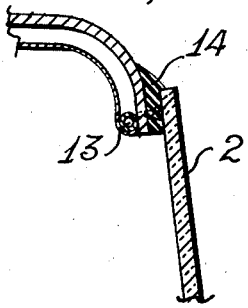
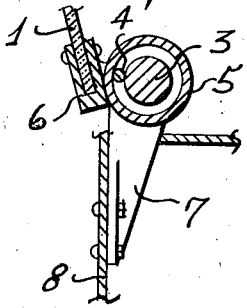
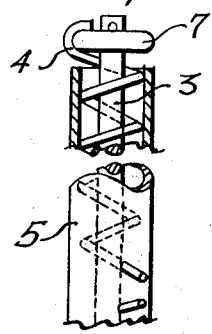
INVENTOR.
SAM BLOOMFIELD
BY Patented Aug. 8, 1944

2,355,264

UNITED STATES PATENT OFFICE 2,355,264

WINDSHIELD FOR MOTOR VEHICLES

Sam Bloomfield, Wichita, Kans.

Application May 24, 1943, Serial No. 488,154

2 Claims. (Cl. 296—84)

This invention relates to new and useful improvements in windshields for motor vehicles, and has for its principal object the elimination of visual obstruction within the area of the windshield proper, and more particularly from its terminal sides that are arced rearward and having wings for the arced portions that terminate in near alignment with the driver's seat, and the said components of the windshield being integrally joined and void of refractive formations, whereby a clear, uninterrupted view is provided for the driver of a motor driven vehicle, and furthermore, the usual corner posts heretofore employed are eliminated.

A further object of this invention is to provide a windshield structure wherein the rearwardly extending side portions of the windshield may be raised to permit exit of the driver when the door of the vehicle is being opened.

These and other objects will hereinafter be more fully explained, reference being had to the accompanying drawings forming a part thereof, and wherein like characters will apply to like parts in the different views.

Referring to the drawings:

Fig. 1 is a fragmentary side elevation of a vehicle, embodying my invention.

Fig. 2 is a front elevation thereof.

Fig. 3 is a fragmentary plan view of the windshield structure and vehicle.

Fig. 4 is an enlarged sectional view taken on line 4—4 in Fig. 3.

Fig. 5 is an enlarged sectional view taken on line 5—5 in Fig. 3.

Fig. 6 is an enlarged fragmentary plan view of the lifting mechanism for the windshield structure.

My invention herein disclosed relates to a windshield structure consisting of a front transparent portion 1 having integrally formed at each corner a rearwardly extending transparent running portion 2 to provide for continuous vision for the driver of the vehicle in an arc of approximately 180 degrees. The corners where the side portions connect to the front portion are arced to avoid any possibility of visual refraction for the driver.

A suitable means is provided to hingedly connect the front of the windshield structure to the cowl of the vehicle, whereby the rearward portion of the windshield may be rocked upward as shown by dotted lines in Fig. 1, permitting access to the interior of the vehicle.

It will be seen that the suitable means above referred to may consist of a rod 3 having a pair of coil springs 4 wound thereon, and engaging over said springs is a sleeve 5 which is integrally connected to a channel element 6 that is secured to the lower edge of the front portion of the windshield. Each end of the rod extends outward from the sleeve and is trunnioned in a bracket 7 that is carried by the vertical cowl 8 of the vehicle. The inner ends of the springs extend through apertures in the sleeve 5 while their outer ends engage around their respective brackets, said springs being tensioned sufficiently to turn the sleeve raising the rearward portion of the windshield when the same has been released.

Secured to the shaft portion of the door handle 9 is a hook 10 engaging another hook 11 secured to the lower edge of the wings of the windshield, and when the door handle is rocked downward the hooks disengage releasing the windshield for an upward rock. To engage the hooks a grip 12 is provided in the wings by pressing a portion of the material outward to form depressions, whereby the fingers of occupants may be positioned therein to pull the windshield downward.

When such a windshield as above described is employed, the forward portion of the top must be strengthened to avoid vibration. This is accomplished by forming the framework of the top out of tubing 13 appropriately positioned in the covering of the top.

To make the joints watertight, a rubber strip 14 is secured to the top between the edge of the windshield structure, all of which are convergently arranged to bind the rubber strip when the portions are rocked downward to their extremity.

The windshield structure herein disclosed may be modified to conform to different makes of vehicle bodies, and such other modifications may be made as lie within the scope of the appended claims.

Having fully described my invention what I claim as new and desire to secure by Letters Patent is:

1. In windshields for motor vehicles of the class described comprising a transparent sheet of material, said sheet having two bends thereacross to subdivide the same into three straight portions, one portion to function as a windshield transversely crossing the motor vehicle, the two other portions extending rearward of the said motor vehicle and being in parallelism with each other and of such length as to cross the forwardly positioned doors of the motor vehicle, and the said one portion of the sheet at its lower extremity being rockably connected to the vehicle body whereby the sheet of transparent material thus subdivided is free to be rocked upward and forward to free the doors for opening and closing the same whereby unobstructed vision is had from rearward of the door and forward across the said one portion of said transparent sheet of material.

2. In windshields for motor vehicles of the class described consisting of three portions formed by two arcuate bends of a sheet of transparent material whereby a channel-like structure is formed and consisting of a web and a pair of legs all integrally joined, the web transversely crossing the cowl of a motor vehicle, while the legs extend rearward across the forwardly positioned doors of the vehicle, the web having means for rockably connecting it to the motor vehicle for forward and upward movement.

SAM BLOOMFIELD.